United States Patent [19]

Williams et al.

[11] Patent Number: 5,757,339
[45] Date of Patent: May 26, 1998

[54] HEAD MOUNTED DISPLAY

[75] Inventors: John W. Williams, Clifton; Michael D. Jenkins, Manassas, both of Va.; Peter A. Ronzani, Los Gatos, Calif.

[73] Assignee: Xybernaut Corporation, Fairfax, Va.

[21] Appl. No.: 779,265

[22] Filed: Jan. 6, 1997

[51] Int. Cl.$^6$ ...................... G09G 3/02
[52] U.S. Cl. .......... 345/8; 345/7; 345/9; 353/71; 359/630; 359/632
[58] Field of Search ........ 345/7, 8, 9; 359/630, 359/631, 633, 632; 348/744, 745, 788; 353/71

[56] References Cited

U.S. PATENT DOCUMENTS

| | | | |
|---|---|---|---|
| 5,321,416 | 6/1994 | Bassett et al. | 345/8 |
| 5,341,242 | 8/1994 | Gilboa et al. | 359/631 |
| 5,515,070 | 5/1996 | Kawada | 345/8 |
| 5,546,492 | 8/1996 | Ansley et al. | 385/116 |
| 5,589,846 | 12/1996 | Kobayashi | 345/8 |
| 5,673,059 | 9/1997 | Zavracky et al. | 345/8 |
| 5,691,737 | 11/1997 | Ito et al. | 345/8 |

*Primary Examiner*—Thomas J. Mullen, Jr.
*Assistant Examiner*—Davetta Woods
*Attorney, Agent, or Firm*—James J. Ralabate

[57] ABSTRACT

A Head Mounted Display (HMD) having both single viewing capability and group viewing capability is provided. The eyepiece of the HMD can be either converted to a group viewing projector or can be replaced or interchangeable with a group viewing unit.

9 Claims, 8 Drawing Sheets

HEAD MOUNTED DISPLAY

This invention relates to a head mounted display (HMD) and, more specifically, to a novel HMD that is adapted for use with a mobile or other computer.

BACKGROUND OF THE INVENTION

In a copending application U.S. Ser. No. 08/538,194 filed Sep. 9, 1995, various body worn computers were disclosed. In this same copending application, many concepts, including several activation means such as voice activation, eye tracking and brain activation are described. Each of the embodiments of Ser. No. 08/538,194 is incorporated by reference into the present disclosure. Thus, while the present invention will be described for the sake of clarity with reference to voice activation, it is to be understood that any of the embodiments disclosed in Ser. No. 08/538,194 are intended to be included in the present invention.

Many head mounted viewing systems for viewing a plurality of displays have been known and used. Typical of these prior art display units are disclosed in U.S. Pat. Nos. 5,003,300; 5,162,828; U.S. Pat No. Des. 371,549 and in PCT International Publication No. WO95/11473 published Apr. 27, 1995. Each of the systems described involve a head mounted display connected to a remote or other signal source for providing the subject matter to be displayed.

In Wells U.S. Pat. No. 5,003,300 a head mounted display is disclosed which is connected to a remote signal source which may be a computer, pocket calculator or a radio wave transmitter which provides power, timing information and drawing signals necessary for driving the display. The system of Wells is not a voice activated system but rather one that relies upon keyboard or mouse manipulation for driving the display. Thus, Wells does not contain voice activation means in the head mounted display.

The Furness patent U.S. Pat. No. 5,162,828 discloses a display system for conventional eyewear using a translucent display. The display system of Furness includes a light transmissive display mounted on the frame of the eyewear for use by the person wearing the conventional eyewear. Again, Furness' system is not designed for use in or with a voice activated computer system.

The Ronzani design patent U.S. Pat. No. Des. 371,549 illustrates a head mounted display system having a movable eyepiece or cell that appears to be capable of both horizontal and vertical adjustment. Nothing in Ronzani, however, suggests use of his head mounted display system in a voice activated computer system.

The WO95/11473 publication (Kopin) dated Apr. 27, 1995 discloses a multitude of head mounted display configurations. In some of the embodiments disclosed by Kopin the display is connected to a video or information source such that the user can view information or images shown on the display. In one of Kopin's embodiments, the display can be mounted to a frame so that the user can move the display in and out of the user's field of view. Some of the illustrations in Kopin present a head mounted display containing earphones and a microphone connected to or integral therewith. The microphone is used to convey voice activation commands to the computer for ultimate transmission to the display means used. In Kopin the earphones are hinged to the head band 512 and attached to one of the earphones as a microphone arm 690 having a microphone 559 attached at its distal end. It is important to note that Kopin uses two earphones, both of which are permanently attached to the headset structure; see Kopin FIGS. 34A through 34D. The headset of these figures is clamped over the head and pressure exerted on each ear portion in order to hold the headset in place on the wearer's head.

In each of the above discussed prior art display systems, only the user wearing the HMD may view the object being displayed on the eyepiece or display unit. There are many occasions where the wearer would like to convey to others the subject matter being displayed; this is not possible with the prior art HMDs in present use.

SUMMARY OF THE INVENTION

It is therefore an object of this invention to provide a novel head mounted display (HMD) that is devoid of the above noted disadvantages.

Another object of this invention is to provide an HMD that has means to convert the display to an image projector for group viewing.

Still a further object of this invention is to provide a novel cartridge or conversion unit that can be used interchangeably with the eyepiece or cell.

Yet another object of this invention is to provide an HMD system that can be used for single person or group viewing.

A further object of this invention is to provide an HMD that has removable components in the eyepiece that can be used to convert the eyepiece from a single person viewing apparatus to a group viewing apparatus.

These and other objects of this invention are accomplished by a novel HMD system that contains an eyepiece or cell that is easily converted from a single viewing display apparatus to a projector or group viewing display apparatus. There are situations where only the viewing of an image by the HMD wearer is required; there are other situations where it would be very desirable for a group of people to view the image being displayed. In this second situation, use of the present HMDs requires the wearer to remove his or her headset and transfer it to another user in order that this second or many subsequent wearers can view the image being displayed. With the present invention, this tedious procedure is no longer required. The wearer merely quickly converts his or her eyepiece to a projector and projects the image being displayed on a wall (or other screen) for the entire group assembled to view. This type of use is invaluable, for example, at meetings were one mobile body worn computer is in use, but it is important for the audience to see the image being displayed upon voice or other activation of the computer. The conversion of the display panel, or eyepiece or cell to a projector can be accomplished in a variety of ways. One way is to have a removable eyepiece that can be easily replaced with a projector cartridge or unit. The projector unit will contain a light source, focus lens, a condensing lens, an LCD or other suitable display means and optionally and preferably a small fan. Once the eyepiece is removed and replaced by the projector cartridge, the image presented by the mobile computer can be projected for group observation. Another method to convert the eyepiece to a projector would be to merely replace the components of the eyepiece with projector components. The user merely would remove the HMD heatsink and backlite from the HMD and install a projector focus lens. Also, the wearer would remove the HMD condensing lens and HMD optics and install a condensing lens and a light source. Obviously, one easy method would be just to remove the detachable HMD eyepiece unit and replace it with the detachable projector unit or cartridge. Any other suitable conversion means may, of course, be used in the system of this invention. It also would be convenient if the projector cartridge contained legs or a stand for easy use as a projector. Any suitable display, projector focus lens, condensing lens, light source and fan may be used in the projector of this invention. Any HMD including those of the prior art may be retrofitted or altered so that the eyepiece can be detachable and can be replaced with a projector unit or projector components.

The HMD of this invention is particularly useful in a mobile computer-hands free, body worn system, but obviously can be used whenever an HMD is worn, such as, if desirable, with any other type computer including lap tops and stand alone computers. By "single viewing" in this disclosure is meant to be viewed only by the wearer of the HMD, whereas "group viewing" means by multiple persons including the wearer.

DETAILED DESCRIPTION OF THE DRAWINGS AND PREFERRED EMBODIMENTS

Figure 1:
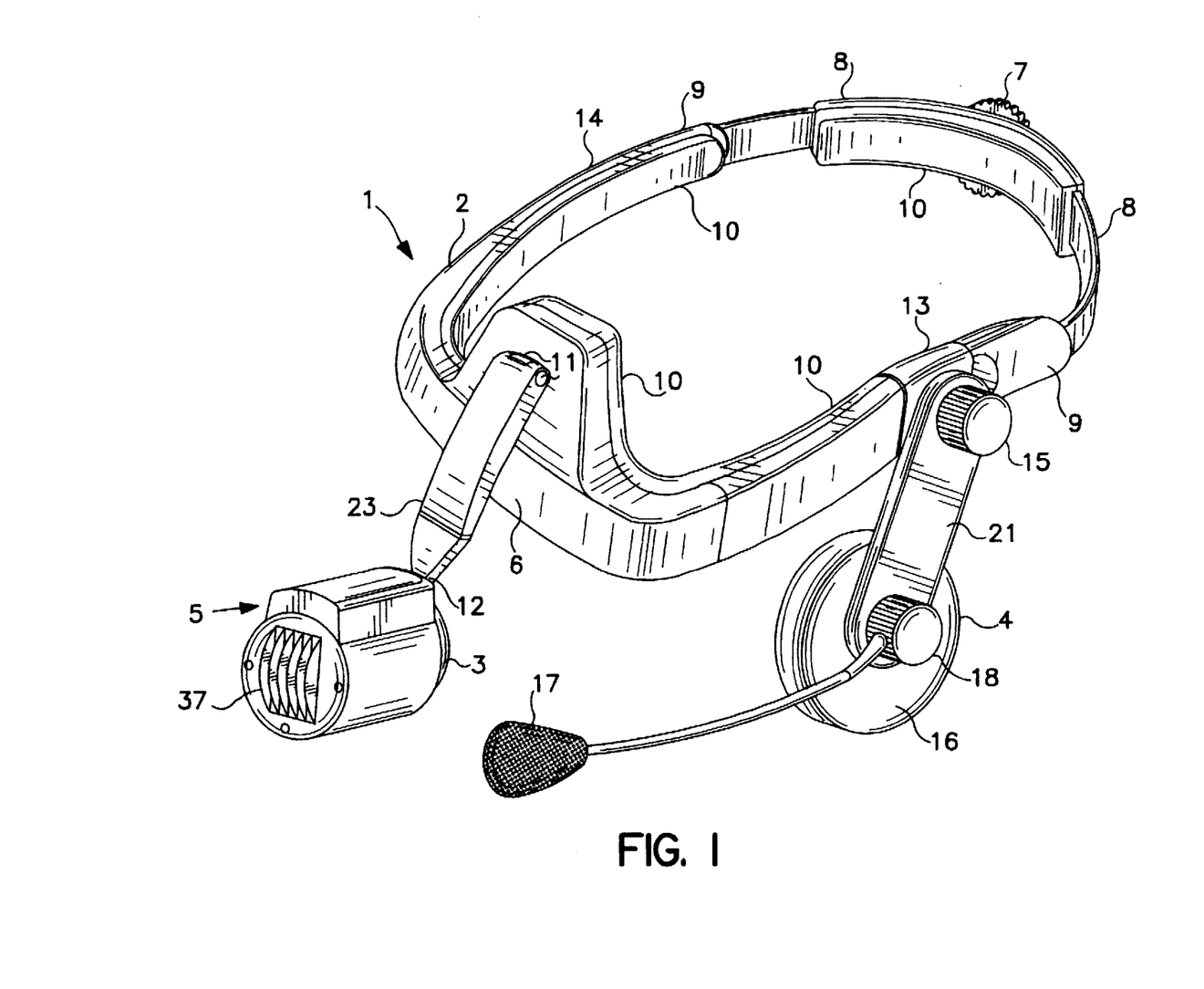
FIG. 1 is a perspective side view of an HMD embodiment that can be used in the projector conversion system of the present invention.

In FIG. 1, a head mounted display 1 useful in the present invention is illustrated. The HMD contains the conventional headband 2, and a removable or detachable eyepiece unit 5. Eyepiece cartridge or unit 5 has the conventional display cell 3 for single person viewing and can be removable or detachable at points 11 or 12. The HMD 1 can optionally contain a communication unit 4 or any other suitable communication unit with an earphone 16 and a microphone or voice (or other) activation means 17 that will activate the system to produce an image in cell 3 or projector unit 19 (see FIG. 4). The communication means 4 may optionally use various adjusting means such as 15, 18 and 21. The HMD 1 may also optimally contain an eye guard 6 that will prevent cell 3 from hitting the user's head or eye. A heat sink 37 is used in the eyepiece unit 5 but removed when used as the projector unit 19. Various headband adjusting means 7 may be used if desired to alter the size of the headband. The headband may be also adjustable using parts 8 and 9 and/or flexible headband liner 10. The communication means 4 may be removable at point 13 if desirable and used at point 14, but certainly is not necessary in the present invention.

Figure 4:
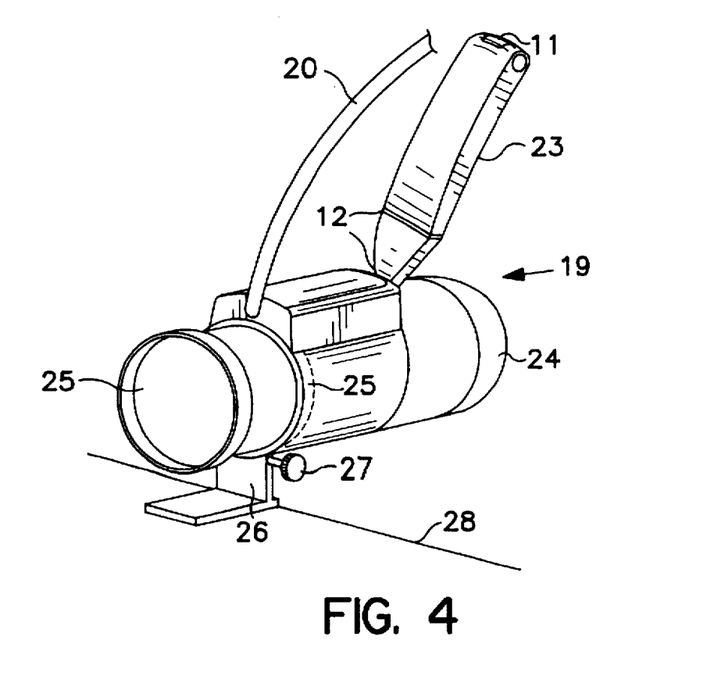
FIG. 4 is a front perspective of a detachable HMD projector unit used in the present invention.

Critical features necessary in the present invention include the removable eyepiece unit 5 which can be detached from the HMD at points 11 or 12 and replaced with a detachable projector cartridge or unit 19 (shown in FIG. 4).

Figure 2:
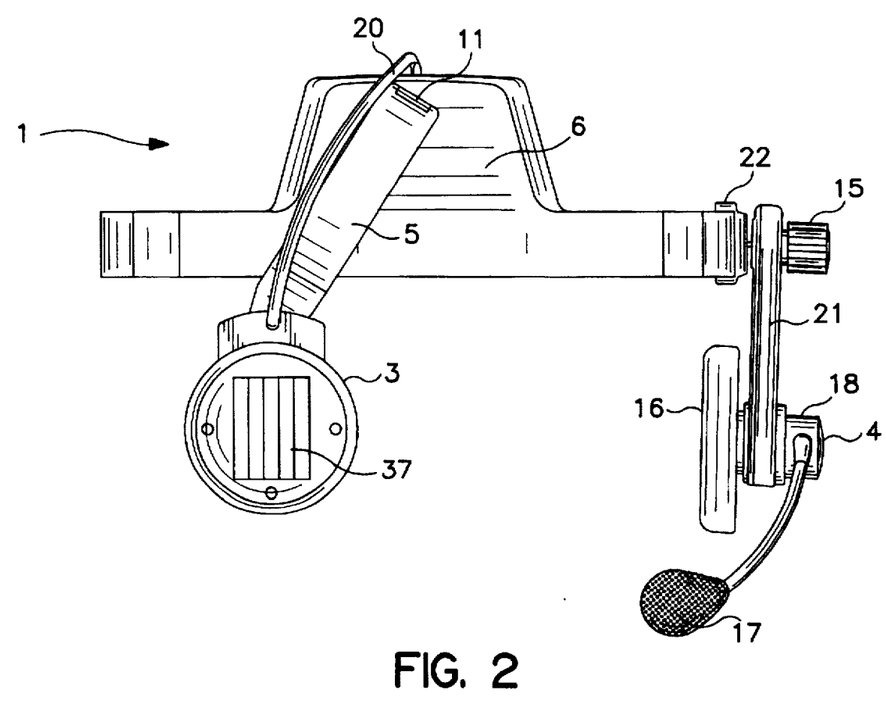
FIG. 2 is a front plan view of an HMD embodiment that can be used in the projector conversion system of this invention.

In FIG. 2 the same HMD 1 is illustrated having a computer connection means 20 which electrically connects the HMD 1 with a signal source which may be a computer, mobile computer, processor or other means that provide an image for viewing the HMD 1 including eyepiece unit 5 or projector unit 19 (see FIG. 4). Clamp 22 may be used to attach or detach communication unit 4 from the HMD 1, if desired.

Figure 3:
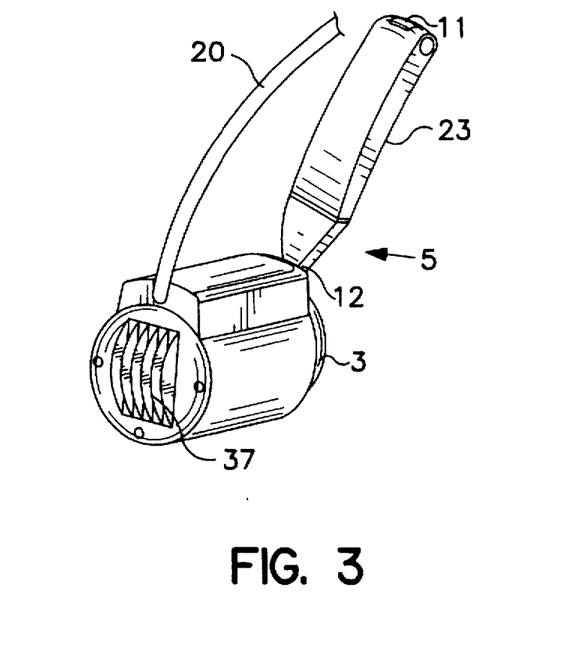
FIG. 3 is a front perspective view of a detachable HMD eyepiece unit used in the present invention.

In FIG. 3 a detachable eyepiece unit 5 is illustrated having upper detachable means 11 and/or lower detachable means 12 or any other suitable location, depending upon the desired usage. In some situations, it is easier to remove the entire unit 5 including stem 23 and connector 20 (option A), and in other cases it may be preferred to remove just cell 3 and attach stem 23 and connector 20 to the equivalent projector housing component 24 (option B). Stem 23 and connector 20 may be the same or may be different components depending on removal options A or B above noted. Unit 5, in any event, must contain all of the necessary components for an eyepiece display unit used in any of the conventional prior art units herein discussed and incorporated by reference into this disclosure.

In FIG. 4 the detachable or removable projector unit 19 is illustrated having all of the necessary elements or components of a conventional projector housed in projector housing 24. The image projected will be transmitted through focus lens 25 and can be projected onto a wall or screen or any other viewing space for group observation and viewing. A retractable adjusting stand 26 is preferably used when the projector cartridge 19 is utilized. The stand 26 can be adjusted via adjusting knob 27 upwardly so as to be out of the way or can be adjusted downwardly to alter the height of housing 24. The unit 19 can be detached at points 11 and/or 12 by any suitable means. Stand 26 will fit flat upon a support or table 28.

Figure 5:
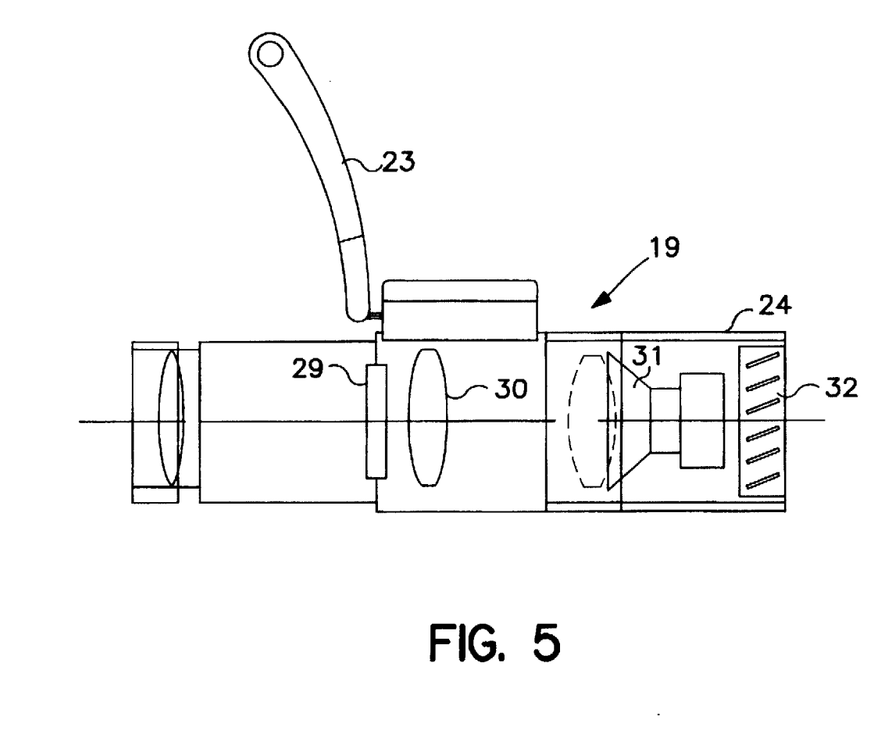
FIG. 5 is an exploded view of the detachable projector cartridge usable in the present invention.

In FIG. 5, an exploded view of the interior of projector housing 24 is shown. The projector unit of this invention includes a housing 24, a focus lens 25, an LCD 29 or any other suitable video display means, a condensing lens 30, a light source such as a halogen lamp 31 and a fan 32. All of these components can be contained in the projector cartridge 19 or they can be introduced into the housing 24 after removing the single display components of cell 3. For example, in a conventional cell 3, the HMD heatsink and backlite are removed and a focus lens 25 installed. Also the HMD optics are removed and the condensing lens 30 and light source 31 for the projector are installed. A fan 32 is installed at the rear portion as shown in FIG. 5. As earlier noted, it would be simpler to have all of the components of the projector in an all inclusive replacement cartridge 19 which will snap in place of the display cell cartridge 5 when the conversion from single person viewing to group viewing is desired.

Figure 6:
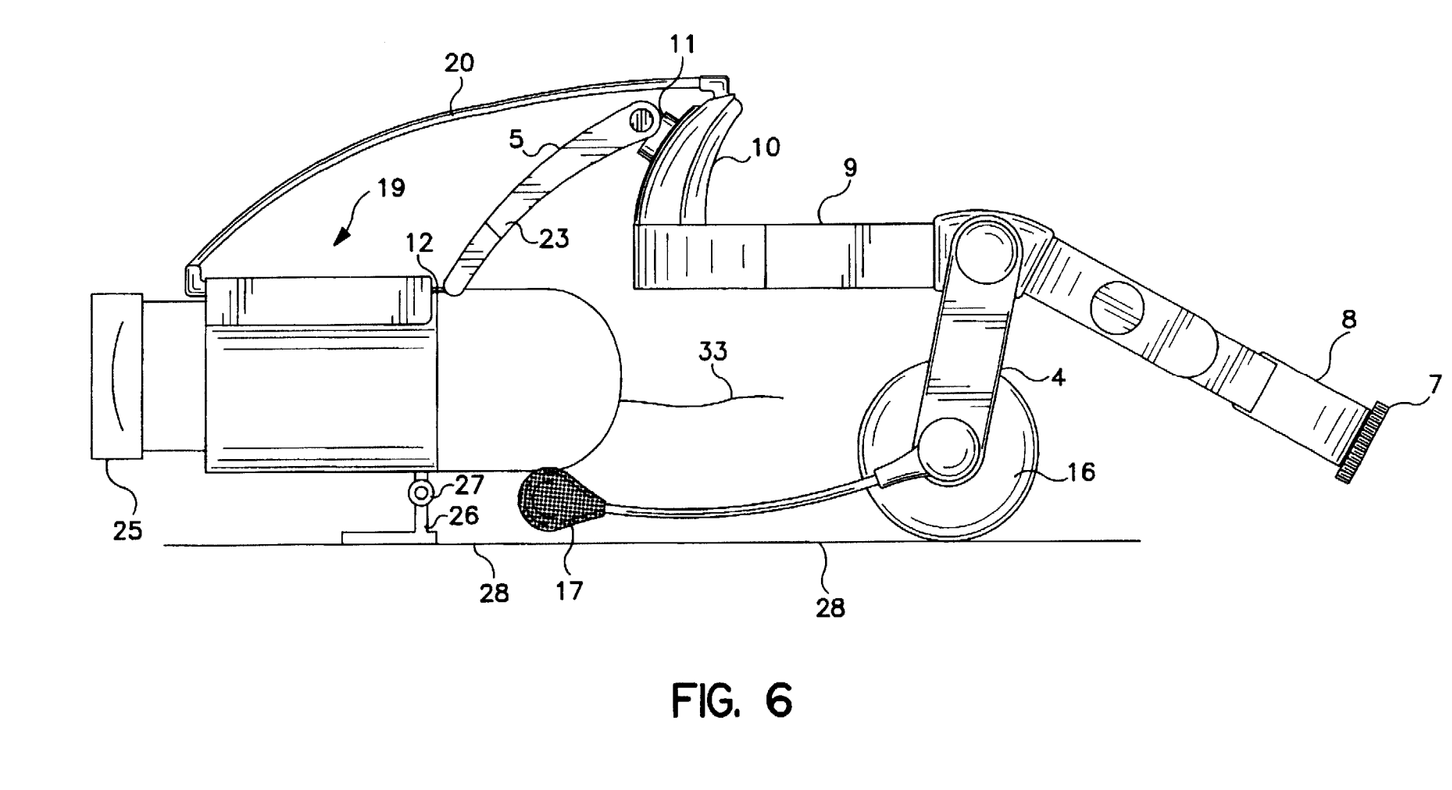
FIG. 6 is a side plan view of the HMD structure when used as a projector.

In FIG. 6 the use of the HMD 1 as a projector for group viewing is illustrated where stand 26 and earphone 16 rest for total support upon a table 28 or other projector support 28. The height of the projector unit 19 can be adjusted by the use of adjusting knob 27 and stand 26. Any suitable projector height adjusting means or support(s) may be used, if suitable. Obviously, the HMD could also have two locations where the eyepiece 3 can remain in place (not removable or be folded out of the way) but the display function can be transferred to a projection unit 19 which is attached at a second of said two locations. Thus, rather than each eyepiece 3 and projection unit 19 being removable, it is within the spirit of this invention if the functions, ie., single viewing vs group viewing, are transferrable from cell unit 3 to projection unit 19. While this transfer function is included within this invention, the removable concept where cell 3 is removed and replaced with projector unit 19 is highly preferred for many reasons. One important reason is to reduce the weight of the HMD and also for simpler and less complex operation.

Figure 7:
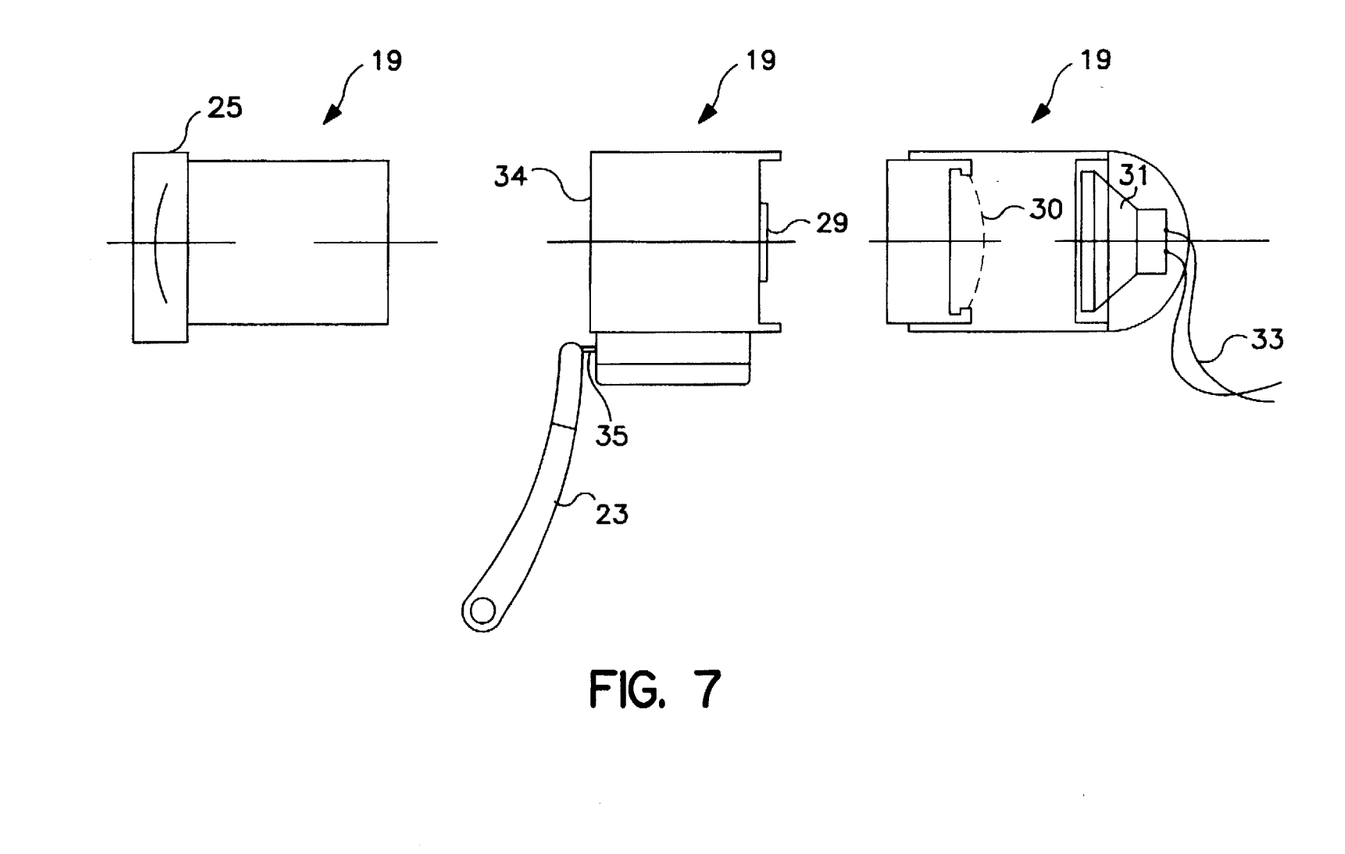
FIG. 7 is a side exploded view of the projector unit of this invention whether a detachable unit or a reassembled HMD eyepiece unit. The optional fan is not shown in this figure.
Figure 8:
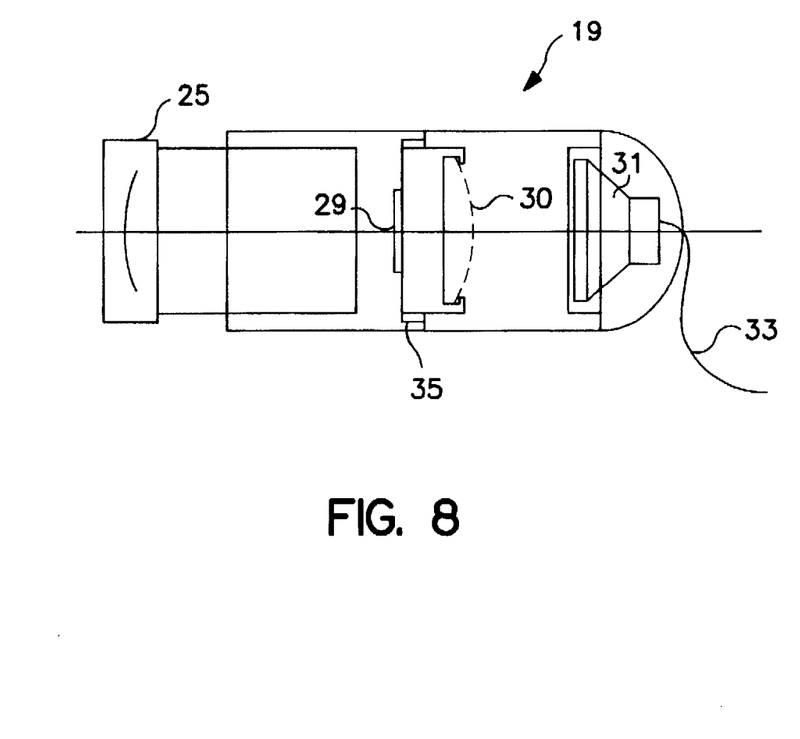
FIG. 8 is a side view of the projector unit of FIG. 7 when assembled.

In FIGS. 7 and 8 the components of the projector housing 24 of projector unit 19 are shown; in FIG. 7 in a detached or exploded view and in FIG. 8 in an assembled plan view. The preferred embodiment containing a fan 32 is not shown in these figures, however, a small or suitable fan 32 is highly preferred in the projector unit 19 of this invention. The focus lens 25 has conventional focusing means used in known projector embodiments. The existing cell 3 component (which can optionally be used when the cell is reassembled to form a projector) may be assembled with the focus lens 25 and condensing lens 30, with a power source 33 to form the projector unit 19. The components of the existing cell, i.e. LCD (or other display) and the partial housing 34 together with the vertical/horizontal image adjustor 35 may become components of the projector unit 19 shown in FIGS. 7 and 8.

Figure 9:
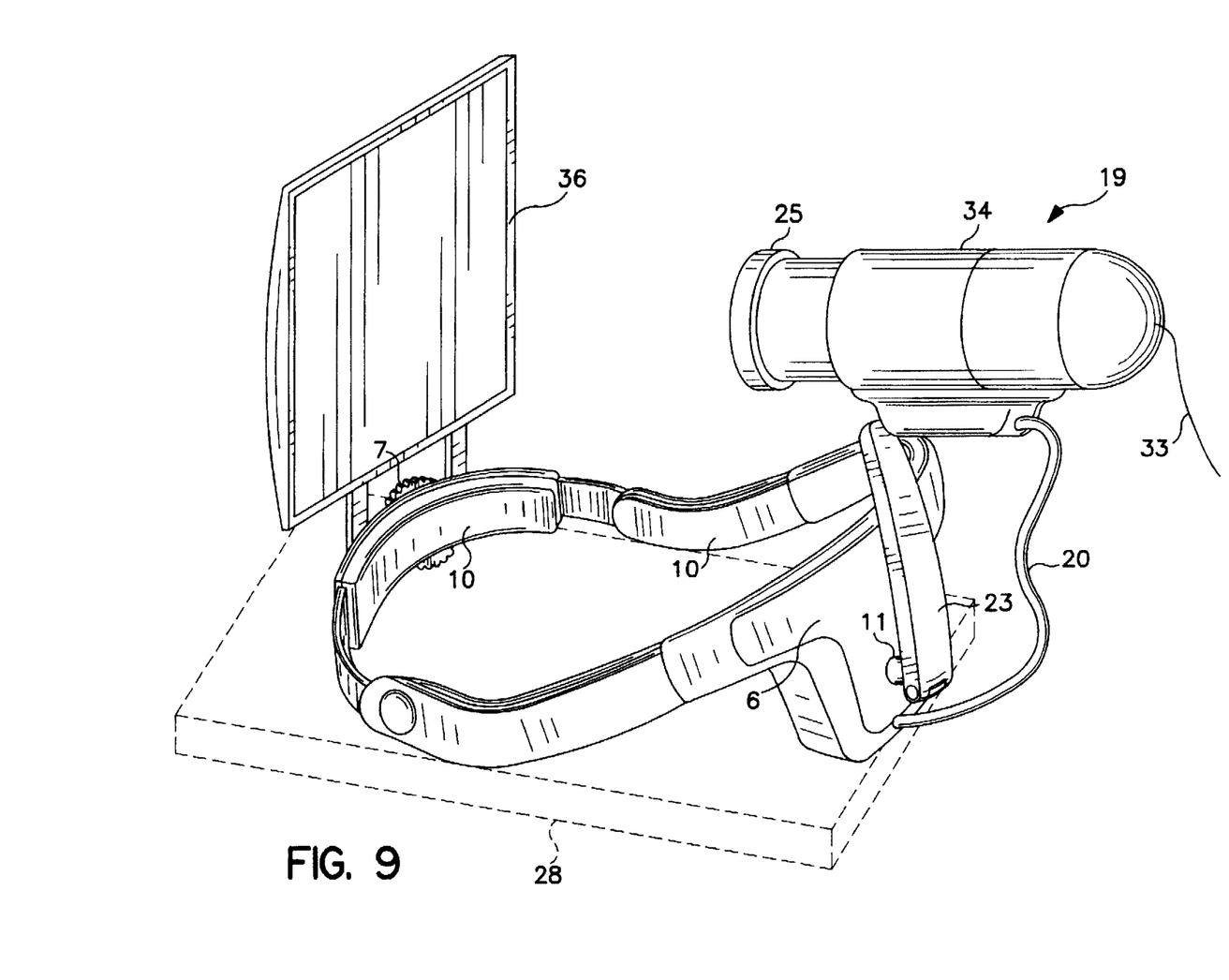
FIG. 9 is a side perspective view of an embodiment of the HMD of this invention when used as a projection system with an optional screen attachment.

In FIG. 9 another embodiment of the HMD 1 when used in the projection mode is shown. An optional clip-on screen 36 may be used for group displaying or the image can be projected upon a wall or other flat surface. An advantage of the embodiment of FIG. 9 is that the lightweight unit with a clip-on source can be easily carried and used when both single and group viewing is desired. The HMD of FIG. 9 can be set up on a table 28 and will contact the table 28 at three points marked in the drawing with an X.

The preferred and optimumly preferred embodiments of the present invention have been described herein and shown in the accompanying drawing to illustrate the underlying principles of the invention, but it is to be understood that numerous modifications and ramifications may be made without departing from the spirit and scope of this invention.

What is claimed is:

1. A head mounted display (HMD) comprising a detachable eyepiece unit, said head mounted display also containing means to receive in place of said detachable eyepiece unit a projector unit, said projector unit having means to project for group viewing any display viewable on said eyepiece unit.

2. The head mounted display of claim 1 wherein said HMD is used in a body worn, mobile computer system.

3. The head mounted display of claim 1 wherein said projector unit is composed of replacement components used in place of removable components of said eyepiece unit.

4. The head mounted display of claim 1 wherein said projector unit is a projector housing containing substantially all of the conventionally necessary components of a projector, and can interchangeably, with said eyepiece, fit on a corresponding portion of said HMD.

5. The head mounted display of claim 1 wherein said projector unit has a stand for said projector unit which can be adjusted to alter a height of said projector unit.

6. The head mounted display of claim 1 wherein said projector unit comprises a display means, a focus lens, a condensing lens, a light source and a fan.

7. The head mounted display of claim 1 wherein said eyepiece unit is convertible into a projector unit by the removal of components from said eyepiece unit and replacing them with components necessary for a projector unit.

8. The head mounted display of claim 1 wherein said HMD has the same means therein for attachment to a single viewing eyepiece or to a group viewing projector means.

9. A head mounted display comprising means to be used as either or both a single viewing display means, or means to be used as a group viewing display means, said single viewing display means comprising a conventional eyepiece display means used on an HMD for wearer viewing, said group viewing display means comprising a projector unit, each of said eyepiece and said projector being electrically connected to any signal source, including a computer, processor or other image producing means and wherein said eyepiece unit is convertible into a projector unit by the removal of components from said eyepiece unit and replacing them with components necessary for a projector unit.

* * * * *